(12) United States Patent
Goldschmidt Iki et al.

(10) Patent No.: US 6,295,646 B1
(45) Date of Patent: Sep. 25, 2001

(54) METHOD AND APPARATUS FOR DISPLAYING VIDEO DATA AND CORRESPONDING ENTERTAINMENT DATA FOR MULTIPLE ENTERTAINMENT SELECTION SOURCES

(75) Inventors: Jean M. Goldschmidt Iki, San Jose; Christopher D. Williams, Soquel; Anthony A. Shah-Nazaroff, Santa Clara; David N. Hackson, Sunnyvale, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/166,134

(22) Filed: Sep. 30, 1998

(51) Int. Cl.[7] ............................ H04N 5/445; H04N 7/173
(52) U.S. Cl. .............................. 725/41; 725/43; 725/131; 348/564
(58) Field of Search ...................... 345/326, 327; 348/564–566, 906, 10; 455/6.2; 725/37, 38, 39, 41, 43, 46, 131, 139, 151

(56) References Cited

U.S. PATENT DOCUMENTS

| | | | |
|---|---|---|---|
| 5,550,576 | 8/1996 | Klosterman | 348/6 |
| 5,815,145 * | 9/1998 | Matthews, III | 345/327 |
| 5,900,868 * | 5/1999 | Duhualt et al. | 345/327 |

OTHER PUBLICATIONS

International Search Report, PCT/US99/21537, Feb. 23, 2000, 6 pages.

* cited by examiner

*Primary Examiner*—John W. Miller
(74) *Attorney, Agent, or Firm*—Blakely, Sokoloff, Taylor & Zafman LPP

(57) ABSTRACT

A graphical user interface (GUI) includes a first window that displays video data of a first entertainment selection from a first entertainment selection source. A first area, proximate to the first window, displays entertainment system data that corresponds to the first entertainment selection. The GUI includes a second window that displays video data of a second entertainment selection from a second entertainment selection source. A second area, proximate to the second window, displays entertainment system data that corresponds to the second entertainment selection.

32 Claims, 7 Drawing Sheets

METHOD AND APPARATUS FOR DISPLAYING VIDEO DATA AND CORRESPONDING ENTERTAINMENT DATA FOR MULTIPLE ENTERTAINMENT SELECTION SOURCES

FIELD OF THE INVENTION

The present invention relates to the field of entertainment systems. Specifically, the present invention relates to graphical user interfaces (GUI) in entertainment systems that display video data and entertainment system data.

BACKGROUND OF THE INVENTION

A current trend in the electronics and computer industry is the convergence of computer systems and more traditional entertainment system components. As this convergence continues, more components in these systems will be combined together resulting in an increase in entertainment selections and entertainment system data available to users.

Current mechanisms for storing and providing entertainment system data to users are component specific. For example, programming guides made available by many cable companies provide some entertainment system data relating to entertainment selections available to the users. Typically, the programming guides provide an on-screen display of programming information for channels supported by the cable system. The programming guides, however, do not store or display entertainment system data from sources other than the cable company to the user. Thus, for example, if a user's entertainment system includes a digital satellite system (DSS), a vertical blanking interval (VBI) decoder, a modem, a network connection, or a video library, the entertainment system data from these entertainment selection would not be available to the user on the cable system's programming guide.

In addition, the programming guides typically display limited information about an entertainment selection. The information is usually limited to the title of the entertainment selection, the time it is broadcasted, and the channel broadcasting the entertainment selection. The information is typically presented in a static text format.

SUMMARY

A graphical user interface (GUI) is disclosed. The GUI includes a first window that displays video data of a first entertainment selection from a first entertainment selection source. A first area, proximate to the first window, displays entertainment system data that corresponds to the first entertainment selection. The GUI includes a second window that displays video data of a second entertainment selection from a second entertainment selection source. A second area, proximate to the second window, displays entertainment system data that corresponds to the second entertainment selection.

BRIEF DESCRIPTION OF THE DRAWINGS

The present invention is illustrated by way of example and not by way of limitation in the figures of the accompanying drawings, in which like references indicate similar elements and in which.

DETAILED DESCRIPTION

Figure 1:
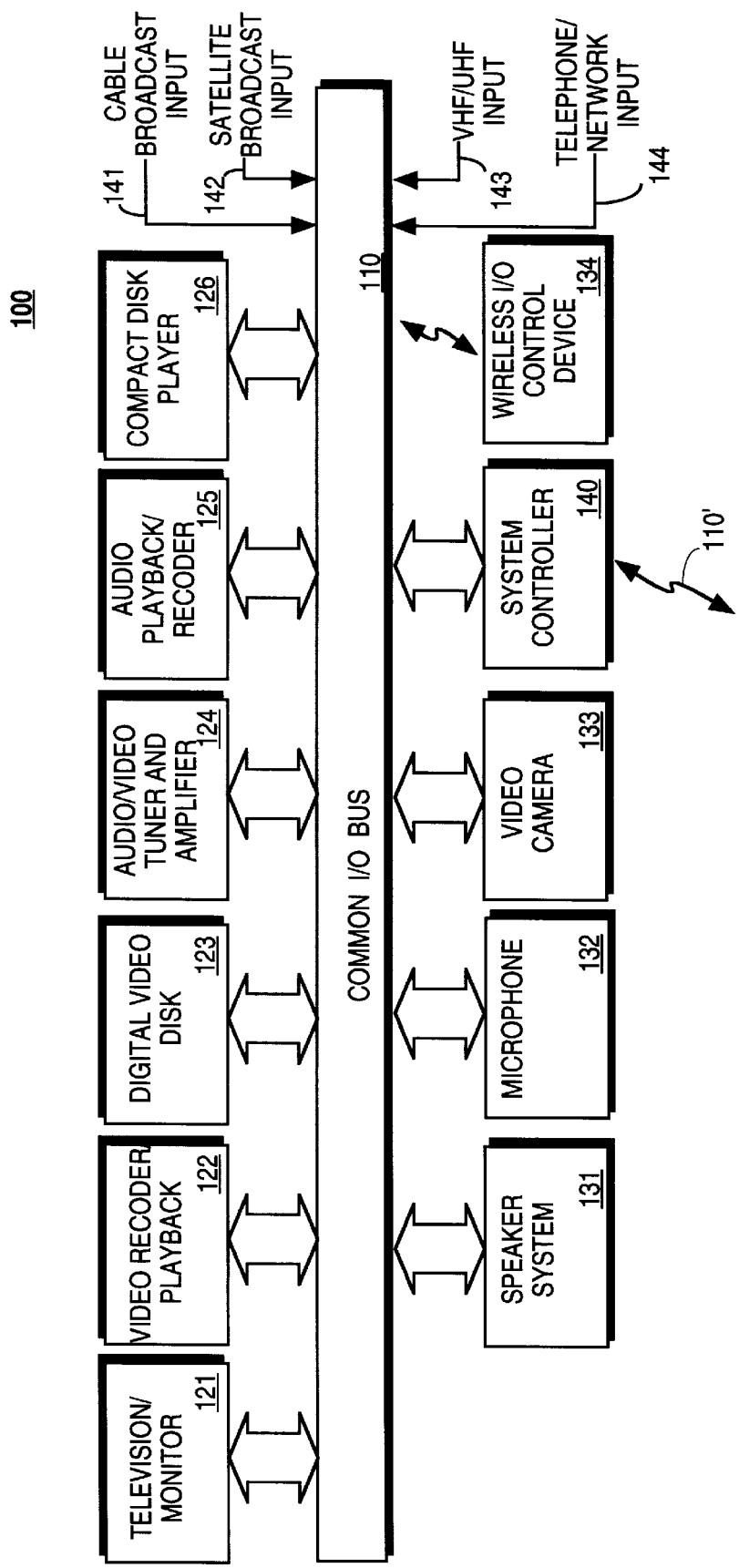
FIG. 1 is a block diagram illustrating the system components of one embodiment of an entertainment system according to the present invention.

FIG. 1 is a block diagram illustrating system components of an entertainment system 100 according to one embodiment of the present invention. The entertainment system includes a common input/output (I/O) bus 110 that connects the system components in the entertainment system 100 together. It should be appreciated that the common I/O bus 110 is illustrated to simplify the routing of signals between the computer system components. The common I/O bus 110 may represent a plurality of known mechanisms and techniques for routing I/O signals between the computer system components. For example, the common I/O bus 110 may include an appropriate number of independent audio "patch" cables that rout audio signals, coaxial cables that rout video signals, two-wire serial lines or infrared or radio frequency transceivers that rout control signals, or other routing mechanisms that rout other signals.

In the illustrated embodiment, the entertainment system 100 includes a television/monitor 121, video recorder/playback device 122, digital video disk (DVD) recorder/playback device 123, audio/video tuner and amplifier 124, audio playback/recorder device 125, and compact disk player 126 coupled to the common I/O bus. The video recorder/playback device 122, DVD recorder/playback device 123, audio playback/recorder device 125, and compact disk player 126 may be single disk or single cassette devices, or alternatively may be multiple disk or multiple cassette devices.

In addition, the entertainment system 100 includes a speaker system 131, microphone 132, video camera 133, and a wireless I/O control device 134. In one embodiment, wireless I/O control device 134 is an entertainment system remote control unit, which communicates with the components of the entertainment system 100 through IR signals. In another embodiment, wireless I/O control device 134 may be a wireless keyboard and cursor-positioning device that communicates with the components of entertainment system 100 through IR signals or RF signals. In yet another embodiment, wireless I/O control device 134 may be an IR remote control device similar in appearance to a typical entertainment system remote control with the added feature of a track-ball or other navigational mechanisms which allows a user to position a cursor on a display of the entertainment system 100.

The entertainment system 100 also includes a system controller 140. According to one embodiment of the present invention, the system controller 140 operates to store and display entertainment system data available from a plurality of entertainment system data sources. According to another embodiment of the present invention, system controller 140 is configured to control a wide variety of features associated with each of the system components. As shown in FIG. 1, system controller 140 is coupled, either directly or indirectly, to each of the system components, as necessary, through I/O bus 110. In one embodiment, in addition to or in place of I/O bus 110, system controller 140 is configured with a wireless communication transmitter (or transceiver), which is capable of communicating with the system components via IR signals or RF signals 110'. Regardless of the control medium, the system controller 140 is configured to control one or more of the entertainment system components of the entertainment system 100, although it is understood that each of the components may be individually controlled with wireless I/O control device 134.

As illustrated in FIG. 1, system 100 may be configured to receive entertainment selections and entertainment system data from various entertainment selection sources. In one embodiment, entertainment system 100 receives entertainment selections and entertainment system data from any or all of the following sources: cable broadcast 141, satellite broadcast 142 (e.g., via a satellite dish), very high frequency (VHF) or ultra high frequency (UHF) radio frequency communication of the broadcast networks 143 (e.g., via an aerial antenna), telephone/computer network broadcast 144, and/or information stored locally at system controller 140 or another component of the entertainment system 100. Further, it will be appreciated by one skilled in the art, that cable broadcast input 141, satellite broadcast input 142 and VHF/UHF input 143 may receive input from digital broadcast programming and digital cable programming. The cable broadcast input 141, satellite broadcast input 142, VHF/UHF broadcast input 143, and telephone/computer network broadcast input 144 may be received by the audio/video tuner and amplifier 124, the system controller 140, or other component on the entertainment system 100.

Although the present invention is described in the context of the exemplary embodiments presented in the figures, those skilled in the art will appreciate that the present invention is not limited to these embodiments and may be practiced in a variety of alternate embodiments. Accordingly, the innovative features of the present invention may be practiced in a system of greater or lesser complexity than that of the system depicted in FIG. 1.

Figure 2:
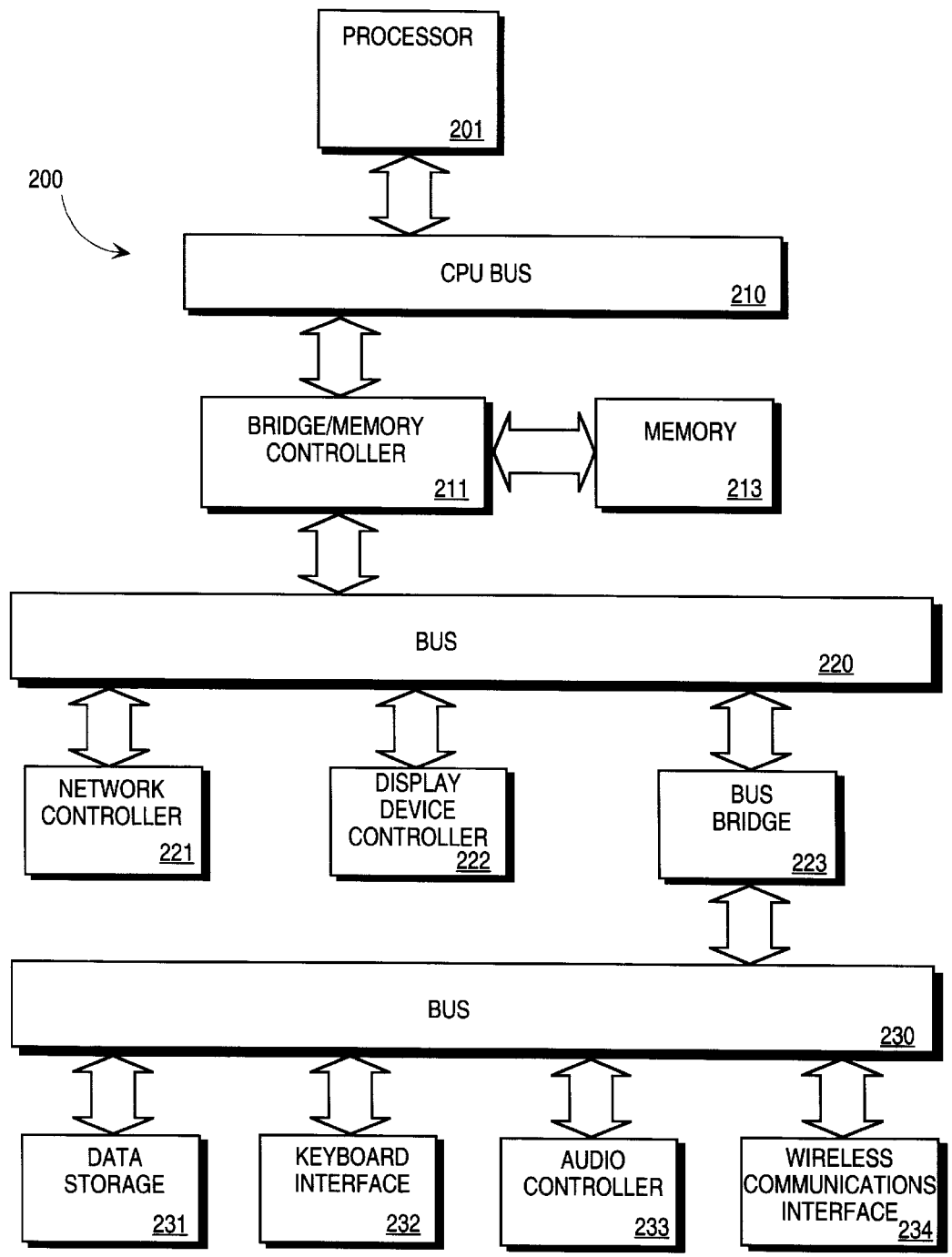
FIG. 2 is a block diagram illustrating one embodiment of a system controller according to the present invention.

FIG. 2 is a block diagram illustrating an embodiment of a computer system 200 that may be used to implement the system controller 140 according to the present invention. The computer system 200 includes a processor 201 that processes data signals. The processor 201 may be a complex instruction set computer (CISC) microprocessor, a reduced instruction set computing (RISC) microprocessor, a very long instruction work (VLIW) microprocessor, a processor implementing a combination of instruction sets, or other processor device. FIG. 2 shows an example of the present invention implemented on a single processor computer system 200. However, it is understood that the present invention may be implemented in a computer system having multiple processors. The processor 201 is coupled to a CPU bus 210, which transmits data signals between processor 201 and other components in the computer system 200.

As an example, memory 213 may be a dynamic random access memory (DRAM) device, a static random access memory (SRAM) device, or other memory device. The memory 213 stores data signals that are executed by the processor 201. A bridge memory controller 211 is coupled to the CPU bus 210 and the memory 213. The bridge memory controller 211 directs data signals between the processor 201, the memory 213, and other components in the computer system 200 and bridges the data signals from these components to a first I/O bus 220.

The first I/O bus 220 may be a single bus or a combination of multiple buses. As an example, the first I/O bus 220 maybe a high performance I/O bus that operates at high throughput rates. The first I/O bus 220 may include for example a Peripheral Components Interconnect (PCI) bus, a Personal Computer Memory Card International Association (PCMCIA) bus, a NuBus, or other buses. The first I/O bus 220 provides communication links between components in the computer system 200. A network controller 221 is coupled to the first I/O bus 220. The network controller 221 links the computer system 200 to a network of computers and supports communication among the machines. A display device controller 222 is coupled to the first I/O bus 220. The display device controller 222 allows coupling of a display device to the computer system 200 and acts as an interface between the display device and the computer system 200. The display device controller 222 may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 201 through the display device controller 222 and displays the information and data signals to the user of the computer system 200. According to an embodiment of the present invention, the display device may be implemented by the television/monitor 121 (shown in FIG. 1).

A second I/O bus 230 may be a single bus or a combination of multiple buses. The second I/O bus 230 may include an Industry Standard Architecture (ISA) bus, an Extended Industry Standard Architecture (EISA) bus, or other buses. The second I/O bus 230 provides communication links between components in the computer system 200. A data storage device 231 is coupled to the second I/O bus 230. The data storage device 231 may be a hard disk drive, a floppy disk drive, a CD-ROM device, or other mass storage device. A keyboard interface 232 is coupled to the second I/O bus 230. The keyboard interface 232 may be a keyboard controller or other keyboard interface. The keyboard interface 232 may be a dedicated device or can reside in another device such as a bus controller or other controller. The keyboard interface 232 allows coupling of a keyboard to the computer system 200 and transmits data signals from a keyboard to the computer system 200. An audio controller 233 is coupled to the second I/O bus 230. The second I/O bus 230 operates to coordinate the recording and playing of sounds is also coupled to the I/O bus 230. A wireless communications interface 234 is coupled to the second I/O bus 230. The wireless communications interface 234 may be an IR transceiver or a RF transceiver for transmitting and receiving signals between system components of the entertainment system 100 (shown in FIG. 1).

A bus bridge 223 couples the first I/O bus 220 to the second I/O bus 230. The bus bridge 223 operates to buffer and bridge data signals between the first I/O bus 220 and the second I/O bus 230.

According to one embodiment, configuring a graphical user interface that displays video data and corresponding entertainment system data of entertainment selections from multiple entertainment selection sources concurrently is performed by the computer system 200 in response to the processor 201 executing sequences of instructions contained in the memory 213. Such instructions may be read into the memory 213 from other computer-readable mediums such as data storage device 231 or from a computer connected to the network via the network controller 211. Execution of the sequences of instructions contained in the memory 213 causes the processor to configure a graphical user interface that displays video data and corresponding entertainment system data of entertainment selections from multiple entertainment selection sources concurrently, as will be described hereafter. In alternative embodiments, hard-wire circuitry may be used in place of or in combination with software instructions to implement the present invention. Thus, the present invention is not limited to any specific combination of hardware circuitry and software.

Figure 3:
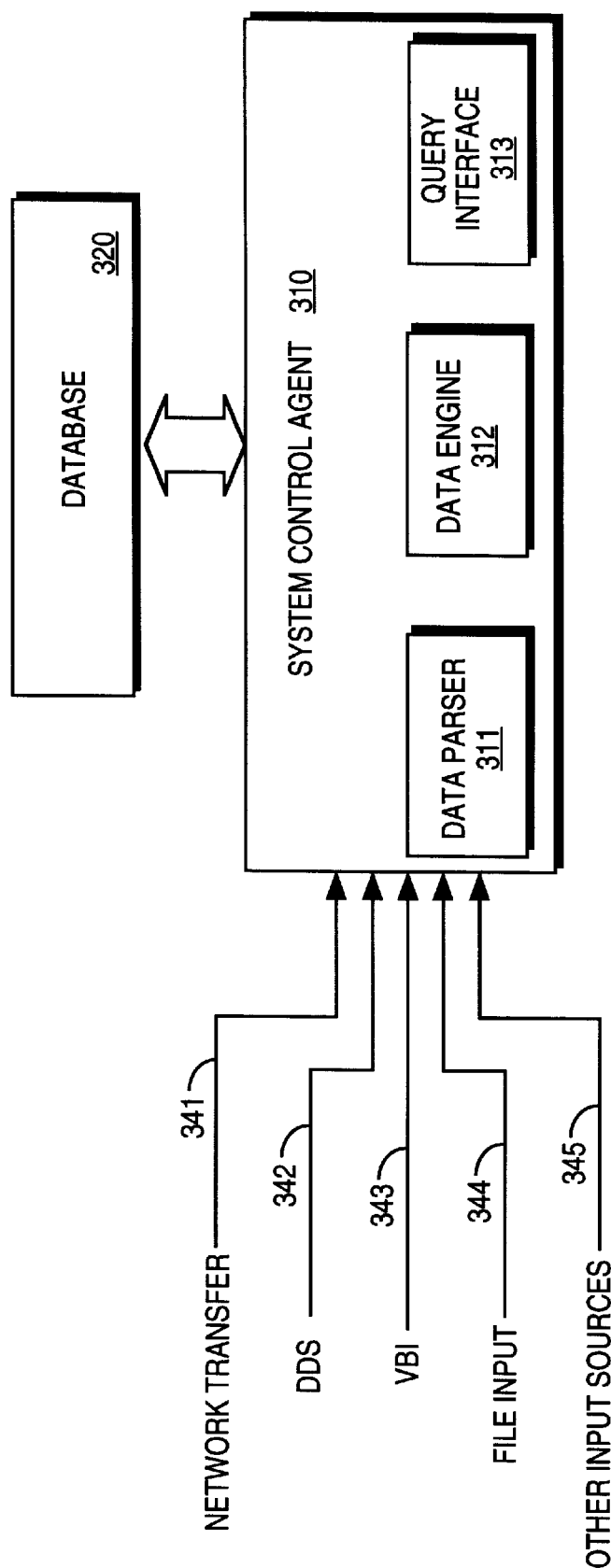
FIG. 3 is a block diagram of modules implementing an embodiment of a database system according to an embodiment of the present invention.

FIG. 3 is a block diagram illustrating modules implementing a database system 300 according to an embodiment of the present invention. In a preferred embodiment of the present invention, the modules are implemented in software and reside in main memory 213 (shown in FIG. 2) of the computer system 200 (shown in FIG. 2) as sequences of instructions. It should be appreciated that the modules may be implemented by hardware as components coupled to the bus 220 (shown in FIG. 2) or a combination of both hardware and software. Block 310 represents a system control agent that receives entertainment system data from multiple sources. The system control agent 310 manages the organization and retrieval of the entertainment system data in the database 320, and presents the entertainment system data to users. The system control agent 310 includes a data parser 311, data engine 312, and query interface 313.

Entertainment system data may be received by the system control agent 310 from a plurality of sources. These sources may include modem transfer 341, DSS 342, VBI 343, file input stream 344, or other input streams 345. Network transfer source 341 provides entertainment system data obtained from remote systems via a conventional modem. According to one embodiment of the present invention, the remote systems are web servers accessed via the Internet using a plain old telephone service (POTS) connection, an integrated services digital network (ISDN) line, or other network connection. DSS source 342 provides entertainment system data obtained via a digital broadcast and a digital satellite receiver. According to one embodiment of the present invention, the entertainment system data is received via a separate digital channel by the DSS receiver. VBI source 343 provides entertainment system data from the vertical blanking interval of a television broadcast. The entertainment system data is decoded from the VBI of the television broadcast by a VBI decoder. File input stream 344 provides entertainment system data obtained from a computer file. The file may be located locally on the computer system 200 or remotely at another computer system. The file may contain, for example, a video clip, a movie review, a video game or other application. Other input streams 345 represent other conventional sources from which entertainment system data could be obtained. It is to be appreciated that any other conventional medium could be used to provide entertainment system data to system control agent 310, including RF broadcasts, ultrasonic broadcasts, IR broadcasts, or other broadcasts. It should also be appreciated that entertainment system data may be provided by the users of the entertainment system 100 (shown in FIG. 1). Entertainment system data may be obtained from any one or more of the sources 341–345.

Entertainment system data includes data related to entertainment selections. The entertainment selections may include programs, music selections, software applications, files, Internet broadcast and other selections that may be made available to users via the entertainment system 100. Entertainment system data may include information describing an entertainment selection or other information related to the entertainment selection. Examples of entertainment system data include television program information, radio station information, "video-on-demand" program information, laser disc availability, compact disk availability, DVD availability, CD-ROM availability, VHS or 8 mm tape availability, software application titles, IntercastTM broadcasts information, network identifiers such as Uniform Resource Locators (URLs), or other data.

In the illustrated embodiment, entertainment system data received from each of the sources 341–345 are in a different, source specific format. Data parser 311 receives the entertainment system data from the sources 341–345 and translates the entertainment system data into a unitary format. The entertainment system data received from the sources 341–345 may include a plurality of information related to an entertainment selection. The data parser 311 generates a record for data corresponding to each entertainment selection. Within each record, the data parser 311 organizes the entertainment system data related to each entertainment system data into traits. Each trait includes an identifier portion that provides a generic description of the trait and a data portion that provides specific data related to the trait or a location of where the specific data may be found. According to one embodiment of the present invention, an identifier portion may be "Title", "Actors", "Program Rating", "Source of Programming", or "Time of Broadcast" and the data portion may be the title of an entertainment selection, actors appearing in the entertainment selection, rating of the entertainment selection, the station where the entertainment selection may be viewed, and the time the entertainment selection is broadcasted. According to another embodiment of the present invention, the identifier portion may be "Program Theme Song", "Video Trailer", "Audio Trailer", "Images of Cast", "Program's Home Page", "Program's Newsgroup", or "Articles about the Program and Cast" and the data portion may include a location of where the information relating to the identifier may be found. For example, the data portion may include a location such as a local address of a graphics file or an audio file stored in the data storage device 232 (shown in FIG. 2) that may be executed. Alternatively, the data portion may include a location such as an Internet address or an URL of a web server that includes a file that contains the information listed in the identifier portion.

Figure 4:
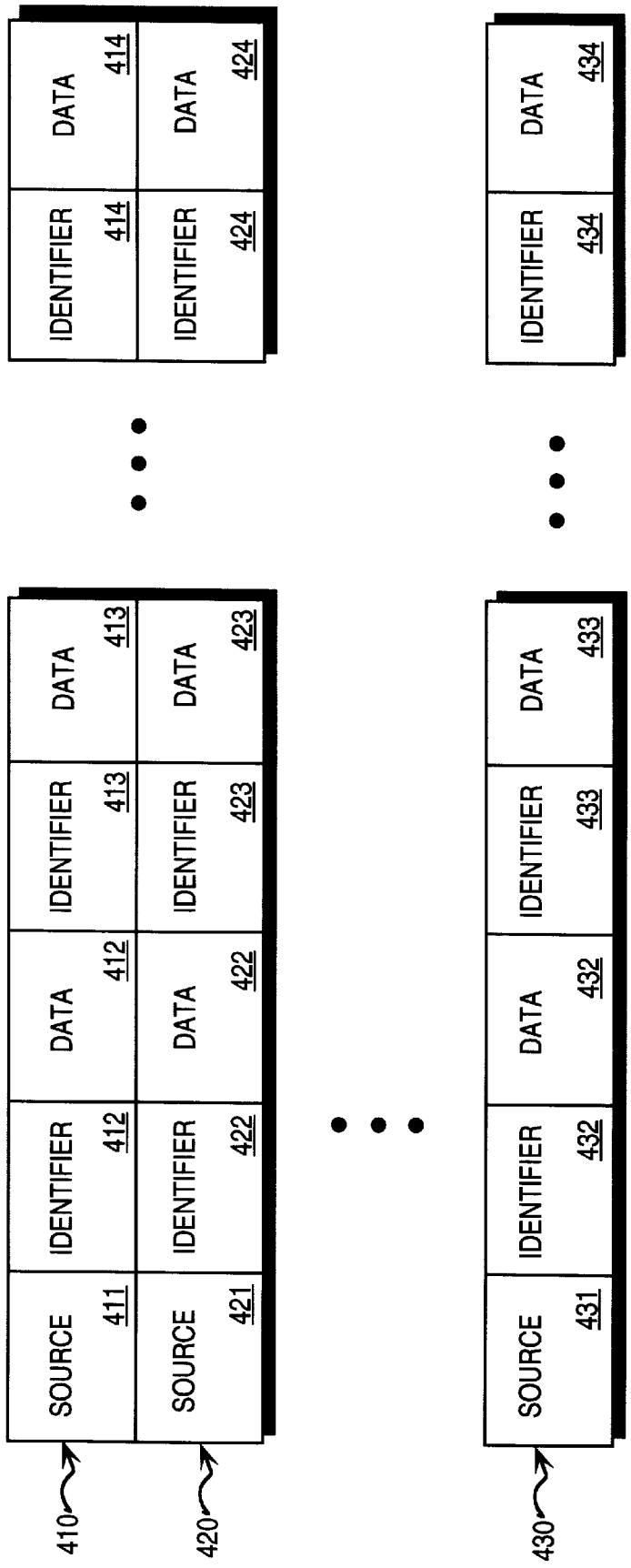
FIG. 4 illustrates entertainment system data records stored in a database according to an embodiment of the present invention.

The data engine 312 receives the entertainment data in the unitary format from the data parser 311 and stores the entertainment system data in the database 320. FIG. 4 illustrates entertainment system data record stored in a database 320 according to an embodiment of the present invention, database 320 includes multiple records 410, 420, and 430. Each of the records 410, 420, and 430 includes a source identifier 411, 421, and 431, respectively. The source identifiers identify sources from which entertainment system data was received to generate the record. It should be appreciated that a record may include entertainment system data received from one or more sources. Each of the records 410, 420, and 430 are shown to include a plurality of traits. It should be appreciated that each record may include any number of traits. Record 410 includes traits 412, 413, and 414. Record 420 includes traits 422, 423, and 424. Record 430 includes traits 432, 433, and 434. Each of the traits includes an identifier portion and a data portion. In an alternate embodiment of the present invention, the records 410, 420, and 430 do not include source identifiers. Referring back to FIG. 3, it should be appreciated that the data parser 311 may organize the entertainment system data using any known technique into any known format and that the data engine 312 may configure the database 320 according to any known format.

The query interface 313 configures a graphical user interface that allows a user to access the entertainment system data stored in the database 320. According to an embodiment of the present invention, the query interface 313 presents the entertainment system data stored in the database 320 in text form. According to another embodiment of the present invention, the query interface 313 presents the entertainment system data stored in the database 320 using multimedia identifiers that may include graphical images, animation, audio clips, or other multimedia identifiers. For example, the query interface 313 may present the identifiers of traits of an entertainment selection using the multimedia identifiers and make the multimedia identifiers user selectable. When a graphical image corresponding to an identifier is selected, the query interface 313 retrieves information in the data portion corresponding to the identifier and presents it to the user. According to an embodiment of the present invention, presenting the information to the user may include displaying the information stored in the data section when the information is specific data related to the trait. According to another embodiment of the present invention, presenting the information may include using the information in the data section to locate additional information when the information is a location. In this embodiment, the multimedia identifier may be a hyper link to a remote web server or a link to a system component local to the graphical user interface.

Figure 5:
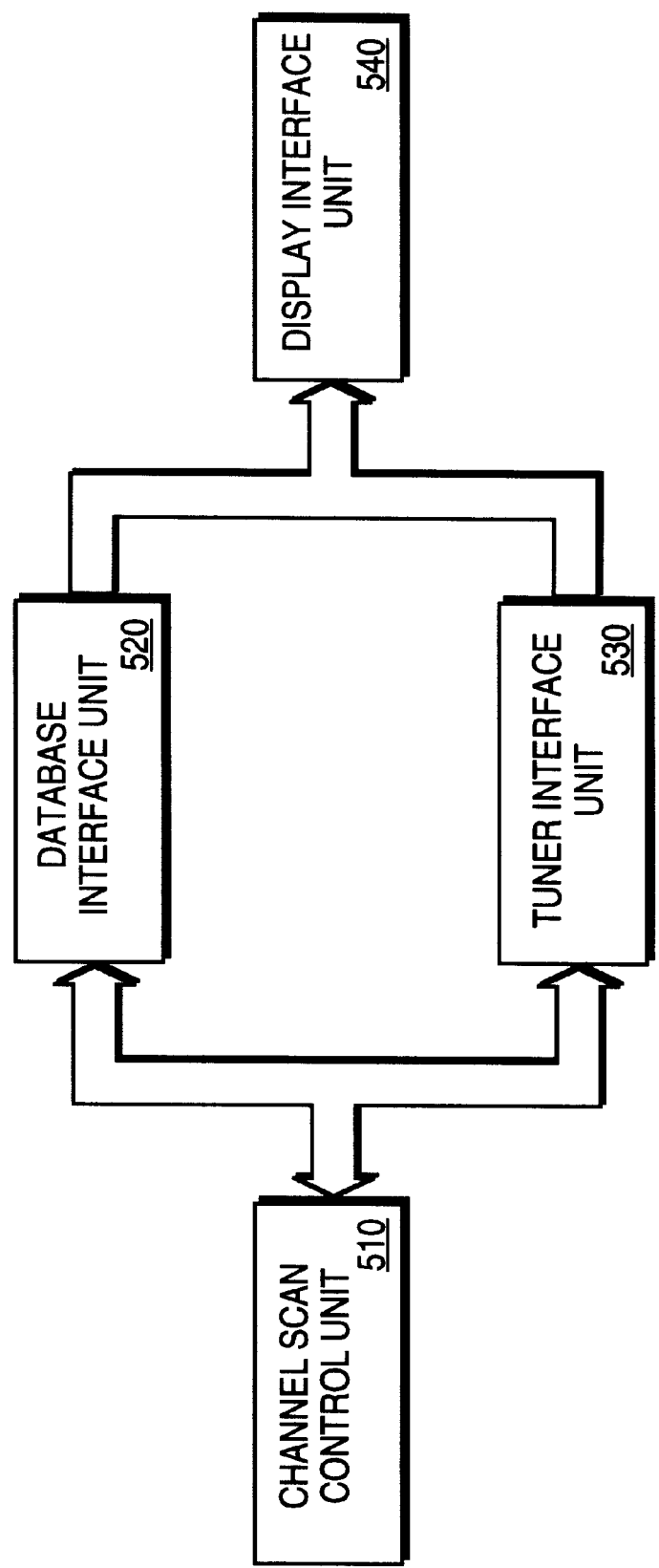
FIG. 5 is a block diagram of a channel scan unit according to an embodiment of the present invention.

FIG. 5 is a block diagram illustrating modules implementing a channel scan unit 500 according to an embodiment of the present invention. The channel scan unit 500 generates a graphical user interface that displays video data and entertainment system selection data from a plurality of entertainment selection sources. In a preferred embodiment of the present invention, the modules are implemented in software and reside in main memory 213 (shown in FIG. 2) of the computer system 200 (shown in FIG. 2) as sequences of instructions. It should be appreciated that the modules may be implemented by hardware as components coupled to the bus 220 (shown in FIG. 2) or a combination of both hardware and software. The channel scan unit 500 includes a channel scan control unit 510. The channel scan control unit 510 stores a list created by a user of the entertainment system 100 (shown in FIG. 1). According to an embodiment of the present invention, the list includes a number of specific entertainment selection sources that the user has a preference for. The entertainment selection sources on the list may include, for example, specific VHF/UHF channels, cable broadcast channels, satellite broadcast channels, Internet broadcast channels, or other entertainment selection sources accessible by the entertainment system 100 (shown in FIG. 1).

A database interface unit 520 is coupled to the channel scan control unit 510. The database interface unit 520 receives the list of entertainment selection sources from the channel scan control unit 510 and obtains entertainment system data corresponding to entertainment selections broadcasted on the listed entertainment selection sources at the present time from the database 320 (shown in FIG. 3).

A tuner interface unit 530 is coupled to the channel scan control unit 510. The tuner interface unit 530 receives the list of entertainment selection sources from the channel scan control unit 510 and programs the audio/video tuner amplifier 124 (shown in FIG. 1) to obtain video data from the entertainment selection sources. According to an embodiment of the channel scan unit 500, the tuner interface unit 530 receives the video data from the entertainment selection sources.

A display interface unit 540 is coupled to the database interface unit 520 and the tuner interface unit 530. The display interface unit 540 receives the entertainment system data corresponding to the entertainment selections from the database interface unit 520 and the video data of the entertainment selections from the interface unit 530. The display interface unit 540 interfaces with the display device controller 222 (shown in FIG. 2) to coordinate the displaying of the entertainment system data with the video data of an entertainment selection. According to an embodiment of the channel scan unit 500, the display interface unit 540 generates a graphical user interface on a display device. The graphical user interface has a first window that displays video data of a first entertainment selection from a first entertainment selection source. A first area, proximate to the first window, displays entertainment system data that corresponds to the first entertainment selection. A second window on the graphical user interface displays video data of a second entertainment selection from a second entertainment selection source. A second area, proximate to the second window, displays entertainment system data that corresponds to the second entertainment selection.

It should be appreciated that in an embodiment of the channel scan unit 500 where the tuner interface unit 530 programs the audio/video tuner amplifier 124 to obtain video data from the entertainment selection sources without actually obtaining the video data from audio/video tuner amplifier 124, the display interface unit 540 coordinates displaying the video data directly with the audio/video tuner amplifier 124. The video data displayed on the first window and the second window may be continuous live feed from the entertainment system source, a still image, or other video data. The video data may correspond to entertainment selections that will be broadcasted or have already been broadcasted.

It should be appreciated that channel scan unit 500 may support other types of lists created by the user. For example, instead of listing preferred entertainment selections, the user may list a preferred actor or actors. In this embodiment of the present invention, the database interface unit 520 obtains the identity of entertainment selection sources broadcasting the entertainment selections with the actor or actors. The identity of the entertainment sources are transmitted to the tuner interface unit 530, via the channel scan control unit 510. The tuner interface unit 530 obtains video data of the entertainment selections. If the entertainment selection source is a component on the entertainment system 100, such as the video recorder/playback device 122 (shown in FIG. 1) or the DVD recorder/playback device 123 (shown in FIG. 1), the tuner interface 530 may obtain video data corresponding to the entertainment selection from a source other than the component on the entertainment system 100. The display interface unit 540 coordinates displaying the video data of the entertainment selections with entertainment system data corresponding to the entertainment selections.

The channel scan control unit 510, the database interface unit 520, the tuner interface unit 530, and the display interface unit 540 may be implemented using any known circuitry or technique. According to an embodiment of the present invention where the channel scan unit 500 is implemented in hardware, the channel scan control unit 510, the database interface unit 520, the tuner interface unit 530, and the display interface unit 540 all reside on a single semiconductor substrate.

Figure 6:
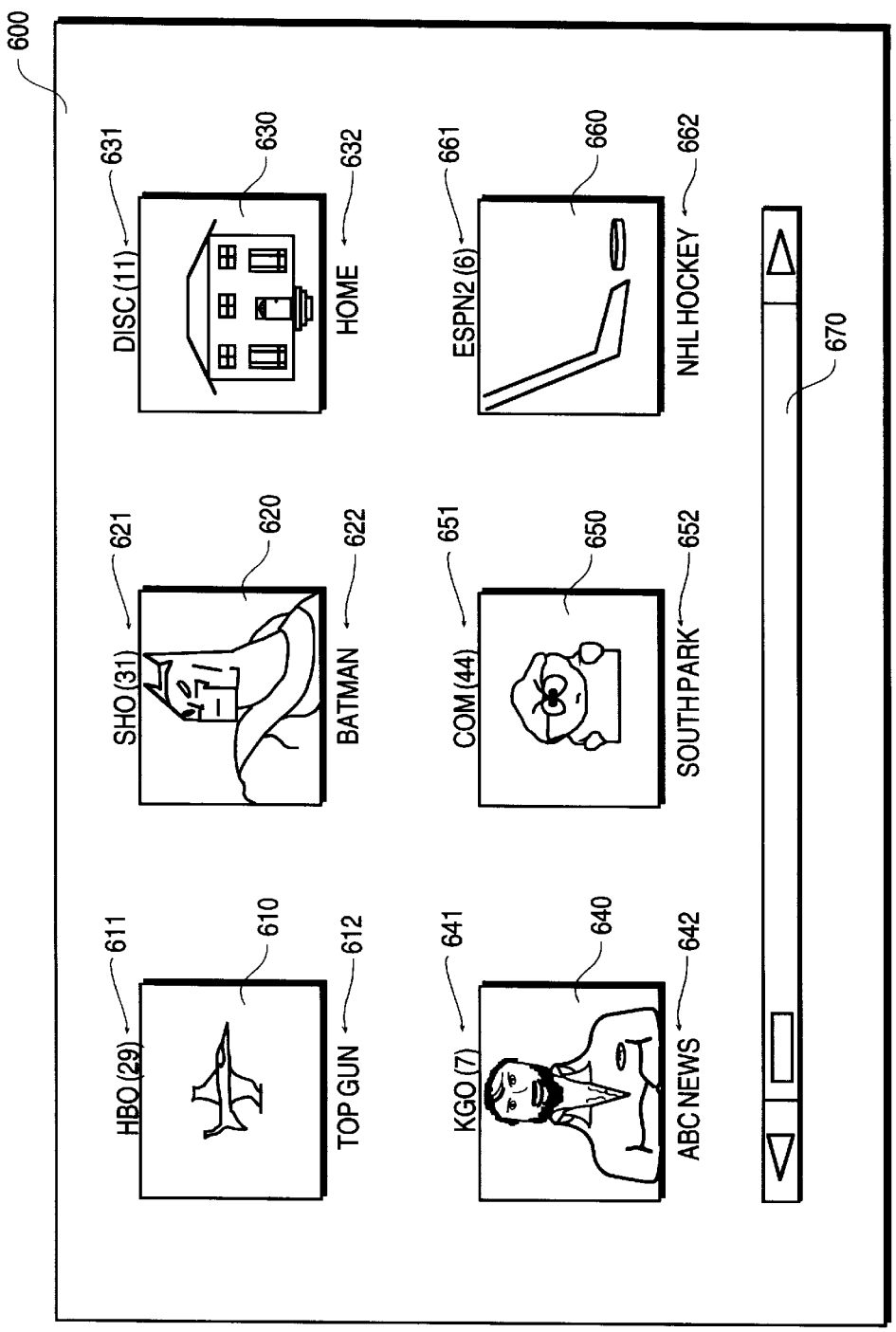
FIG. 6 illustrates a graphical user interface according to a first embodiment of the present invention.

FIG. 6 illustrates a graphical user interface 600 according to a first embodiment of the present invention. The graphical user interface includes a plurality of windows 610, 620, 630, 640, 650, and 660. According to an embodiment of the present invention where the list in the channel scan control unit 510 (shown in FIG. 5) includes a list of entertainment selection sources that the user prefers, each of the windows 610, 620, 630, 640, 650, and 660 display video data of an entertainment selection from one of the entertainment selection sources. Each of the plurality of windows 610, 620, 630, 640, 650, and 660 includes an area proximate to the window that may be used to display entertainment system data corresponding to the entertainment selection. Window 610 includes a first area 611 and a second area 612. Window 620 includes a first area 621 and a second area 622. Window 630 includes a first area 631 and a second area 632. Window 640 includes a first area 641 and a second area 642. Window 650 includes a first area 651 and a second area 652. Window 660 includes a first area 661 and a second area 662. The area proximate to the window may be used to display entertainment system data corresponding to the entertainment selection. The entertainment system data may include a call sign and a channel of where the entertainment selection is broadcasted from, the entertainment selection title, rating information, time or length of broadcast, or other entertainment system data. The graphical user interface 600 also includes a navigational tool 670, such as a scroll bar, that allows a viewer to prompt the graphical user interface 600 to display additional windows that display video data and entertainment system data corresponding to additional entertainment selections not originally displayed on the graphical user interface 600. According to an embodiment of the graphical user interface 600, a user may select one of the windows 610, 620, 630, 640, 650, and 660, to watch the entertainment selection corresponding to the selected window on a full screen of the television/monitor 121 (shown in FIG. 1). According to an alternate embodiment of the present invention, a user may select one of the windows 610, 620, 630, 640, 650, and 660 to obtain additional entertainment system data corresponding to the entertainment selection corresponding to the selected window.

The graphical user interface 600 allows displaying of multiple video images concurrently, where each video image corresponds to a different one of multiple broadcast channels currently available for viewing. Descriptive information relating to the programs currently being broadcast on each channel is displayed along with a video image from that program. According to an aspect of the graphical user interface 600, each of the multiple video images is a current still image, or a "snap shot" of the program being broadcast on the corresponding channel. According to a second aspect of the graphical user interface 600, each of the multiple video images is taken from real-time broadcast of the program from the corresponding channel.

Figure 7:
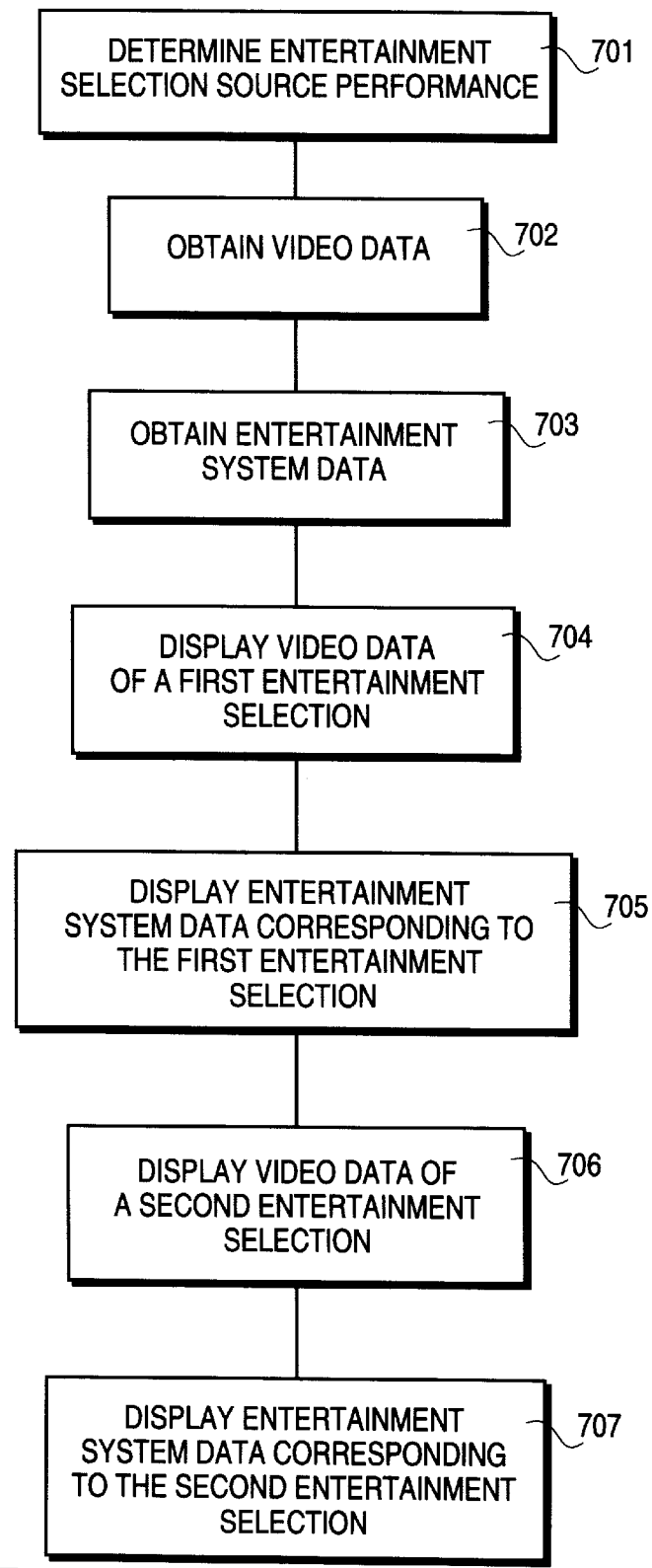
FIG. 7 is a flow chart illustrating a method for managing entertainment system data according to an embodiment of the present invention.

FIG. 7 is a flow chart illustrating a method for managing entertainment system data according to an embodiment of the present invention. At step 701, the preferences of entertainment selection sources of an entertainment system user are determined. According to an embodiment of the present invention, determining the preference of entertainment selection sources is achieved by referencing a list stored in channel scan control unit.

At step 702, video data corresponding to entertainment selections broadcasted on the entertainment sources is obtained. According to an embodiment of the present invention, obtaining the video data corresponding to the entertainment selections broadcasted on the entertainment sources is achieved by programming a video tuner to obtain the video data from the entertainment selection sources.

At step 703, entertainment system data corresponding to the entertainment selections is obtained. According to an embodiment of the present invention, obtaining the entertainment system data corresponding to the entertainment selections broadcasted on the entertainment sources is achieved by accessing a database.

At step 704, video data of a first entertainment selection from a first entertainment selection source is displayed on a first window.

At step 705, entertainment system data corresponding to the first entertainment selection in a location proximate to the first window is displayed.

At step 706, video data of a second entertainment selection from a second entertainment selection source is displayed on a second window.

At step 707, entertainment system data corresponding to the second entertainment selection in a location proximate to the second window is displayed.

In the foregoing specification, the invention has been described with references to specific embodiments thereof. It will, however be evident that various modifications and changes may be made thereto without departing from the broader spirit and scope of the invention. The specification and drawings are, accordingly, to be regarded in an illustrative rather than restrictive sense.

What is claimed is:

1. A method for presenting entertainment selections, comprising:

displaying video data of a first entertainment selection on a first window;

displaying entertainment system data corresponding to the first entertainment selection in a location proximate to the first window;

displaying further entertainment system data corresponding to the first entertainment selection in a second location proximate to the first window;

displaying video data of a second entertainment selection from the second entertainment selection source on a second window; and displaying entertainment system data corresponding to the second entertainment selection in a location proximate to the second window; and displaying further entertainment system data corresponding to the second entertainment selection in a second location proximate to the second window; and displaying still further entertainment system data regarding the entertainment selection corresponding to the respective window upon selection by a user of the first and second windows.

2. The method of claim 1, further comprising;

determining a user's preference of entertainment selection sources;

obtaining video data corresponding to entertainment selections broadcasted on the entertainment selection sources; and obtaining entertainment system data corresponding to the entertainment selections.

3. The method of claim 2, wherein determining a user's preference of entertainment selection sources comprises referencing a list of entertainment selection sources stored in the channel scan control unit.

4. The method of claim 2, wherein obtaining the video data corresponding to the entertainment selections broadcasted on the entertainment sources comprises programming a video tuner to obtain the video data from the entertainment selection sources.

5. The method of claim 2, wherein obtaining the entertainment system data corresponding to the entertainment selections broadcasted on the entertainment sources comprises accessing a database of entertainment selections.

6. The method of claim 1, wherein the further entertainment system data corresponding to the first entertainment selection comprises a title of the first entertainment selection.

7. The method of claim 1, wherein the still further entertainment system data corresponding to the first entertainment selection comprises a description of the first entertainment selection.

8. The method of claim 1, wherein the still further entertainment system data corresponding to the first entertainment selection comprises a rating of the first entertainment selection.

9. The method of claim 1, wherein the still further entertainment system data corresponding to the first entertainment selection comprises a critique of the first entertainment selection.

10. The method of claim 1, further comprising providing a full-screen display of the entertainment selection corresponding to the respective window upon selection by a user of the first and second windows.

11. A computer-readable medium having stored thereon a sequence of instructions, the sequence of instructions including instructions which, when executed by a processor, causes the processor to perform:
   displaying video data of a first entertainment selection on a first window;
   displaying entertainment system data corresponding to the first entertainment selection in a location proximate to the first window;
   displaying further entertainment system data corresponding to the first entertainment selection in a second location proximate to the first window;
   displaying video data of a second entertainment selection from the second entertainment selection source on a second window; and
   displaying entertainment system data corresponding to the second entertainment selection in a location proximate to the second window; and
   displaying further entertainment system data corresponding to the second entertainment selection in a second location proximate to the second window; and
   displaying still further entertainment system data regarding the entertainment selection corresponding to the respective window upon selection by a user of the first and second windows.

12. The computer-readable medium of claim 11, further comprising instructions which, when executed by the processor, causes the processor to perform:
   determining a user's preference of entertainment selection sources;
   obtaining video data corresponding to entertainment selections broadcasted on the entertainment selection sources; and
   obtaining entertainment system data corresponding to the entertainment selections.

13. The computer-readable medium of claim 12, wherein obtaining the video data corresponding to the entertainment selections broadcasted on the entertainment selection sources comprises programming a video tuner to obtain the video data from the entertainment selection sources.

14. The computer-readable medium of claim 12, wherein obtaining the entertainment system data corresponding to the entertainment selections broadcasted on the entertainment selection sources comprises accessing a database of entertainment selections.

15. A graphical user interface (GUI), comprising:
   a first window that displays video data of a first entertainment selection;
   a first area, proximate to the first window, that displays entertainment system data that corresponds to the first entertainment selection;
   a second area, proximate to the first window, that displays further entertainment system data that corresponds to the first entertainment selection;
   a second window that displays video data of a second entertainment selection;
   a first area, proximate to the second window, that displays entertainment system data that corresponds to the second entertainment selection; and
   a second area, proximate to the second window, that displays further entertainment system data that corresponds to the second entertainment selection
   wherein the first and second windows comprise selectable multimedia identifiers that can be selected by a user to cause the display of still further entertainment system data regarding the entertainment selection corresponding to the respective window.

16. The GUI of claim 15, further comprising a navigation tool that allows a user to view additional windows that display video data of additional entertainment selections not originally displayed on the GUI.

17. The GUI of claim 15, wherein the further entertainment system data corresponding to the respective entertainment selection comprises a title of the respective entertainment selection.

18. The GUI of claim 15, wherein the still further entertainment system data corresponding to the respective entertainment selection comprises a description of the respective entertainment selection.

19. The GUI of claim 15, wherein the still further entertainment system data corresponding to the first program comprises a rating of the respective entertainment selection.

20. The GUI of claim 15, wherein the still further entertainment system data corresponding to the first program comprises a critique of the respective entertainment selection.

21. The GUI of claim 15, wherein the selectable multimedia identifiers can further be selected by a user to cause a full-screen display of the entertainment selection corresponding to the respective window.

22. A channel scan unit, comprising:
   a channel scan control unit that stores a list of entertainment selection sources;
   a database interface, coupled to the channel scan control unit, that receives the list of entertainment selection sources from the channel scan control unit and obtains entertainment system data that corresponds to entertainment selections that are broadcasted on the listed entertainment selection sources;
   a tuner interface coupled to the channel scan control unit that receives the list of entertainment selection sources from the channel scan control unit and obtains video data from the listed entertainment selection sources; and
   a display interface coupled to the database interface and the tuner interface that receives the entertainment system data and the video data and venerates a graphical user interface that simultaneously displays the video data and the entertainment system data.

23. The channel scan unit of claim 22, wherein the channel scan control unit, the database interface, the tuner interface and the display interface comprise modules implemented in software resident on a memory of a computer system.

24. The channel scan unit of claim 22, wherein the tuner interface obtains video data by programming a tuner to obtain video data.

25. A computer system, comprising:

a bus;

a processor coupled to the bus;

a display device coupled to the bus;

a channel scan control unit that stores a list of entertainment selection sources;

a database interface, coupled to the channel scan control unit, that receives the list of entertainment selection sources from the channel scan control unit and obtains entertainment system data that corresponds to entertainment selections that are broadcasted on the listed entertainment selection sources;

a tuner interface coupled to the channel scan control unit that receives the list of entertainment selection sources from the channel scan control unit and obtains video data from the listed entertainment selection sources; and a display interface coupled to the database interface and the tuner interface that receives the entertainment system data and the video data and generates a graphical user interface that simultaneously displays the video data and the entertainment system data.

26. The computer system of claim 25, wherein the channel scan control unit, the database interface, the tuner interface and the display interface comprise modules implemented in software resident on a memory of the computer system.

27. The channel scan unit of claim 25, wherein the tuner interface obtains video data by programming a tuner to obtain video data.

28. A graphical user interface (GUI), comprising:

a first window that displays video data of a first entertainment selection;

a first area, on a first side of the first window, that displays an identification of the source of the first entertainment selection;

a second area, on a second side of the first window, that displays a title of the first entertainment selection;

a second window that displays video data of a second entertainment selection;

a first area, on a first side of the second window, that displays an identification of the source of the second entertainment selection; and a second area, on a second side of the second window, that displays a title of the second entertainment selection wherein the first and second windows comprise selectable multimedia identifiers that can be selected by a user to cause the display of descriptive information regarding the entertainment selection corresponding to the respective window.

29. The GUI of claim 28, further comprising a navigation tool that allows a user to view additional windows that display video data of additional programs not originally displayed on the GUI.

30. The GUI of claim 28, wherein the descriptive information comprises at least one of a rating and a critique of the corresponding entertainment selection.

31. A machine-readable medium having stored thereon data representing sequences of instructions which, when executed by a machine, cause the machine to perform operations to provide a channel scan unit, the sequences comprising:

a channel scan control unit that when executed by the machine, causes the machine to store a list of entertainment selection sources;

a database interface, coupled to the channel scan control unit that when executed by the machine, causes the machine to receive the list of entertainment selection sources from the channel scan control unit and obtain entertainment system data that corresponds to entertainment selections that are broadcasted on the listed entertainment selection sources;

a tuner interface coupled to the channel scan control unit that when executed by the machine, causes the machine to receive the list of entertainment selection sources from the channel scan control unit and obtain video data from the listed entertainment selection sources; and a display interface coupled to the database interface and the tuner interface that when executed by the machine, causes the machine to receive the entertainment system data and the video data and generate a graphical user interface that simultaneously displays the video data and the entertainment system data.

32. The channel scan unit of claim 31, wherein the tuner interface obtains video data by programming a tuner to obtain video data.

* * * * *